United States Patent [19]
Schiff et al.

[11] Patent Number: 5,596,403
[45] Date of Patent: Jan. 21, 1997

[54] SYSTEM AND METHOD FOR MEASURING ANGULAR POSITION

[75] Inventors: Tod F. Schiff; Daniel R. Cheever; Daniel J. Wilson, all of Bozeman, Mont.

[73] Assignee: TMA Technologies, Inc., Bozeman, Mont.

[21] Appl. No.: 349,598

[22] Filed: Dec. 2, 1994

[51] Int. Cl.⁶ .................................................. G01B 11/26
[52] U.S. Cl. .................... 356/139.03; 356/141.3; 356/153
[58] Field of Search .................... 356/139.03, 141.1, 356/141.3, 152.1, 153

[56] References Cited

U.S. PATENT DOCUMENTS

| | | | |
|---|---|---|---|
| 3,637,312 | 1/1972 | Cantor et al. | |
| 3,877,816 | 4/1975 | Weiss et al. | 356/138 |
| 3,981,587 | 9/1976 | Gievers . | |
| 3,990,796 | 11/1976 | Foltz, Jr. | 356/152 |
| 4,330,212 | 5/1982 | Miller | 356/354 |
| 4,560,272 | 12/1985 | Harris | 356/138 |
| 4,688,934 | 8/1987 | Clark | 356/34 |
| 4,769,539 | 9/1988 | Thurston | 250/231 R |
| 5,189,799 | 3/1993 | Fairer et al. | 33/281 |
| 5,302,833 | 4/1994 | Hamar et al. | 250/231.1 |

FOREIGN PATENT DOCUMENTS

| | | | |
|---|---|---|---|
| 3803853 | 8/1989 | Germany | 356/141.3 |

*Primary Examiner*—Stephen C. Buczinski
*Attorney, Agent, or Firm*—Madson & Metcalf

[57] ABSTRACT

A system for measuring relative angular position about a roll-axis, a yaw-axis, and a pitch-axis includes a source assembly and a receiver assembly. A source assembly emits a rotationally polarized carrier wave laser beam. A laser beam from a laser diode is directed through a linear polarizer and then through the center of a rotating half-wave plate. The plate is secured to a hollow shaft of an electric motor. The beam travels through the plate and through the hollow shaft. A reference signal corresponding to the rotational modulation imposed by the rotating plate is obtained using a flag which is secured to the shaft and positioned to actuate an optical encoder. After leaving the source assembly and reaching the receiver assembly, the beam travels through another linear polarizer, a neutral density filter, and an aplanatic achromatic lens to a two-dimensional position sensing detector. In response to the beam, the position sensing detector produces output signals that correspond to the position of the beam. The signals are routed to a microprocessor by way of additional electronics. The microprocessor also receives the reference signal from the optical encoder adjacent the rotating motor shaft. The microprocessor then uses the various signals to accurately determine the roll, yaw, and pitch of the receiver assembly relative to the source assembly.

23 Claims, 4 Drawing Sheets

SYSTEM AND METHOD FOR MEASURING ANGULAR POSITION

FIELD OF THE INVENTION

The present invention relates to a system and method for accurately measuring the relative angular position of two structures, and more particularly to an invention which employs a modulated and polarized beam of light transmitted between two structures to accurately measure the relative angular position of the two structures.

TECHNICAL BACKGROUND OF THE INVENTION

Angular position is typically measured with respect to one or more of three axes that are known as the roll-axis, the yaw-axis, and the pitch-axis. These three axes may be illustrated by reference to a pilot sitting in a nose compartment of an aircraft, it being understood that angular measurements are useful in a wide variety of situations not limited to piloting an aircraft. The roll-axis extends longitudinally through the nose and tail of the aircraft, passing through the pilot from front to back. The yaw-axis, which is substantially perpendicular to the roll-axis, extends vertically through the floor and ceiling of the pilot's compartment. The pitch-axis, which is substantially perpendicular to the other two axes, extends horizontally through the left and right side walls of the pilot's compartment.

Changes in relative angular position result from rotation about one or more of these three axes. For instance, if the craft as initially described is in level flight, a one-quarter turn about the pitch-axis will move the craft to a vertical position in which the craft is headed either straight up or straight down, depending on the direction of the turn.

Accurate measurements of relative angular position are useful in a variety of scientific, technical, and industrial applications. For instance, tooling machines typically contain a blade or other cutting element whose position relative to the workpiece is critical. Angular position measurements are used to measure the relative position of the blade and the workpiece in both automated and hand-controlled tooling machines. Accurate angular measurements are also important in bore-sighting alignment and assembling aircraft, rockets, and other aerospace vehicles. The angular position of the fuselage relative to extensions such as the wings, fins, and tail is often critical. Thus, there is a need for instruments which accurately measure the angular position of one structure relative to another structure.

One conventional approach to measuring relative angular position about a roll-axis includes the use of an incandescent lamp which shines two light beams through a rotating disk-shaped linear polarizer. The center of the disk-shaped polarizer is secured to a rotating shaft of an electric motor. The motor is driven at a constant angular rate, thereby modulating the light traveling through an annular portion of the polarizer with respect to time.

The polarizers are generally positioned such that the roll-axis extends generally between the rotating polarizer and a movable target linear polarizer. One of the light beams, known as the "target beam," travels along a first path from the lamp through the rotating polarizer and the target polarizer to a target photosensor. The target photosensor produces a target signal corresponding to the received intensity of the target beam over time.

Another light beam, known as the "reference beam," travels along a different path. The reference beam travels from the lamp through the rotating polarizer, through a fixed reference linear polarizer, and then to a reference photosensor. The reference photosensor produces a reference signal corresponding to the received intensity of the reference beam over time. The phase difference between the reference signal and the target signal corresponds generally to the relative angular position of the reference polarizer and the target polarizer about the roll-axis. Thus, by measuring this phase difference, the target's angular position about the roll-axis is determined.

However, such an approach is sensitive to imperfections in the rotating polarizer. The beam directed at the target photosensor and the beam directed at the reference photosensor pass through different annular portions of the rotating polarizer. Thus, imperfections in one or both annular portions of the rotating polarizer may introduce noise into the reference signal relative to the target signal. Polarizer imperfections may also introduce noise into the target signal alone or the reference signal alone.

In addition, the reference signal is produced by electronically converting the intensity of the polarized reference beam at the reference photosensor into an analog intensity signal and then into a sine wave reference signal. Electronics used to convert periodically increasing and decreasing light intensity into a reference signal typically introduce a phase shift for which the system must compensate. The electronics may also introduce noise during the conversion.

Another conventional approach to measuring relative angular position about a roll-axis includes the use of a laser which emits a single beam of light that is polarized by an annular portion of a rotating linear polarizer. The polarized beam travels through a beam splitter having a mirrored side. A reference portion of the beam is directed by the beam splitter to a fixed reference linear polarizer, and then to a reference photosensor. The reference photosensor produces a reference signal corresponding to the reference beam intensity over time.

A target portion of the beam passes through the beam splitter to a target polarizer and a target retro-reflector. The target retro-reflector reflects the target beam back to the mirrored side of the beam splitter, which in turn directs the target beam to a target photosensor. The target photosensor produces a target signal corresponding to the target beam intensity over time. The phase difference between the reference signal and the target signal corresponds generally to the relative angular position of the reference polarizer and the target polarizer about the roll-axis.

This approach sends only one beam through the rotating polarizer. Thus, optical imperfections in the rotating polarizer are much less likely to introduce noise than in conventional approaches that send two beams through a rotating polarizer. However, the beam still travels through an annular region offset from the center of the rotating polarizer, so polarizer imperfections may still introduce noise into the target signal and into the reference signal.

In addition, the reference signal is still created by converting polarized light intensity into a reference signal. Thus, the problems of phase shifting and noise noted above also arise in connection with the conversion electronics of the beam-splitter approach.

Moreover, it is often desirable to measure pitch and yaw as well as roll. However, the target retro-reflector is designed to always return the beam at the same angle. The beam must be aligned to return to the beam splitter. Changes in the target's pitch or yaw relative to the beam splitter are not captured by the beam, so the beam-splitter approach is restricted to roll measurements.

Thus, it would be an advancement in the art to provide a system for measuring angular position about a roll-axis which is insensitive to imperfections in the annular portions of a rotating polarizer.

It would also be an advancement to provide such a system which does not rely on the electronic conversion of polarized light intensity to produce a reference signal.

It would be a further advancement to provide such a system which also accurately measures changes in position about a yaw-axis and a pitch-axis.

Such a system for measuring angular position is disclosed and claimed herein.

BRIEF SUMMARY OF THE INVENTION

The present invention provides a system and method for measuring relative angular position about a roll-axis, a yaw-axis, and a pitch-axis. In one embodiment, the system includes a source assembly containing a one milliwatt laser diode light source. The light source includes electronics that provide power stability.

The source assembly also includes a laser driver. The laser driver imposes a radio frequency carrier wave modulation on the laser beam to produce a "carrier wave beam." A carrier frequency of about 20 kilohertz is imposed on the beam by switching the laser diode on and off to create a 50 percent duty cycle. The laser diode is enabled and disabled by a timer chip or by a digital microprocessor.

The source assembly also includes a conventional linear polarizer. The carrier wave beam is polarized by the linear polarizer, producing a polarized carrier wave beam. The polarizer and the other optics in the system are coated with an anti-reflective coating corresponding to the wavelength of the laser.

In addition to the laser driver and the linear polarizer, the source assembly includes a rotating half-wave plate. The polarized carrier wave beam is rotationally modulated by transmission through the rotating plate. The light beam that emerges from the rotating plate is thus a rotationally polarized carrier wave beam.

In contrast with conventional approaches, the present invention directs the light beam through the center of the rotating plate. This is accomplished by securing the plate to a hollow shaft of an electric motor. The shaft has a central bore through which a light beam may travel. Thus, imperfections in annular regions about the center of the rotating plate do not introduce noise into the system.

The source assembly is also capable of producing a reference signal corresponding closely to the rotational modulation imposed by the rotating plate. In contrast with conventional systems which produce a reference signal by measuring the intensity of a polarized light beam, the present invention takes the reference signal directly off the motor shaft.

The reference signal is obtained from the motor shaft using an optical encoder positioned near the shaft. A mechanical interrupter flag is secured to the shaft such that the flag, the shaft, and the plate rotate in unison. The optical encoder includes an encoder beam source that is separated from an encoder beam detector by a gap. The encoder beam source, which is not to be confused with the laser diode light source discussed above, transmits an encoder beam across the gap toward the beam detector.

As the shaft rotates, the flag interrupts the encoder beam at time intervals corresponding to the speed of rotation of the shaft. Interruption of the encoder beam generates a phase reference signal which corresponds accurately to the rotation of the plate. The phase reference signal therefore also corresponds accurately to the rotational polarization of the laser beam that is transmitted through the center of the plate.

After the rotationally polarized carrier wave laser beam leaves the source assembly, the beam travels generally along the roll-axis toward a receiver assembly. The receiver assembly also includes a linear polarizer through which the beam passes. An aplanatic achromatic lens is positioned after a neutral density filter to focus the polarized beam on a sensing surface of a two-dimensional position sensing detector.

The position sensing detector is mounted on a mechanical calibration slide with a lock. The slide allows precise initial placement of the sensing surface of the position sensing detector at a distance from the lens equal to the focal length of the lens. In response to impact of the beam on the sensing surface, the position sensing detector produces four analog output signals A, B, C, and D. The four analog signals correspond to the position of the focused beam of light on the sensing surface. The four analog signals are routed through an analog-to-digital convertor to a receiver microprocessor. The four analog signals are also summed, and a signal corresponding to the sum is routed to a phase detector.

The phase detector produces a digital signal which corresponds to the analog phase detected in the amplitude of the light beam impinging on the position sensing detector, as represented by the summed amplitudes of signals A, B, C, and D. The detected phase depends upon the rotation of the receiver polarizer relative to the source polarizer, and hence upon the relative angular positions about the roll-axis of the source assembly and the receiver assembly.

The digital signal is transmitted by the phase detector to the receiver microprocessor. The microprocessor also receives digital versions of the individual output signals A, B, C, and D from the position sensing detector, and the reference signal from the optical encoder adjacent the rotating motor shaft. The receiver microprocessor uses the various signals to determine roll, yaw, and pitch according to mathematically described relationships.

In summary, the present invention provides accurate measurements of angular position about a roll-axis. The present invention is insensitive to-imperfections in the annular portions of a rotating optical element because the beam is transmitted through the center of the rotating wave plate rather than an annular portion of the plate. In addition, the present invention is not limited to roll-axis measurements. The invention also accurately measures changes in yaw and pitch by detecting movement of the beam on a two-axis position sensing detector.

Unlike conventional approaches, the present invention does not rely on the electronic conversion of polarized light intensity to produce a reference signal. Instead, a mechanical flag attached to the rotating motor shaft interrupts the beam of an optical encoder. The resulting reference signal is a clean square-wave signal with very little noise and no significant phase shift.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide a selected embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference is now made to the figures wherein like parts are referred to by like numerals. The present invention relates to a system and method for measuring relative angular position about a roll-axis, a yaw-axis, and a pitch-axis. One embodiment of the system is designated generally at 10 in FIG. 1. The system 10 includes a source assembly 12 which is capable of directing a light beam 14 toward a receiver assembly 16.

Figure 1:
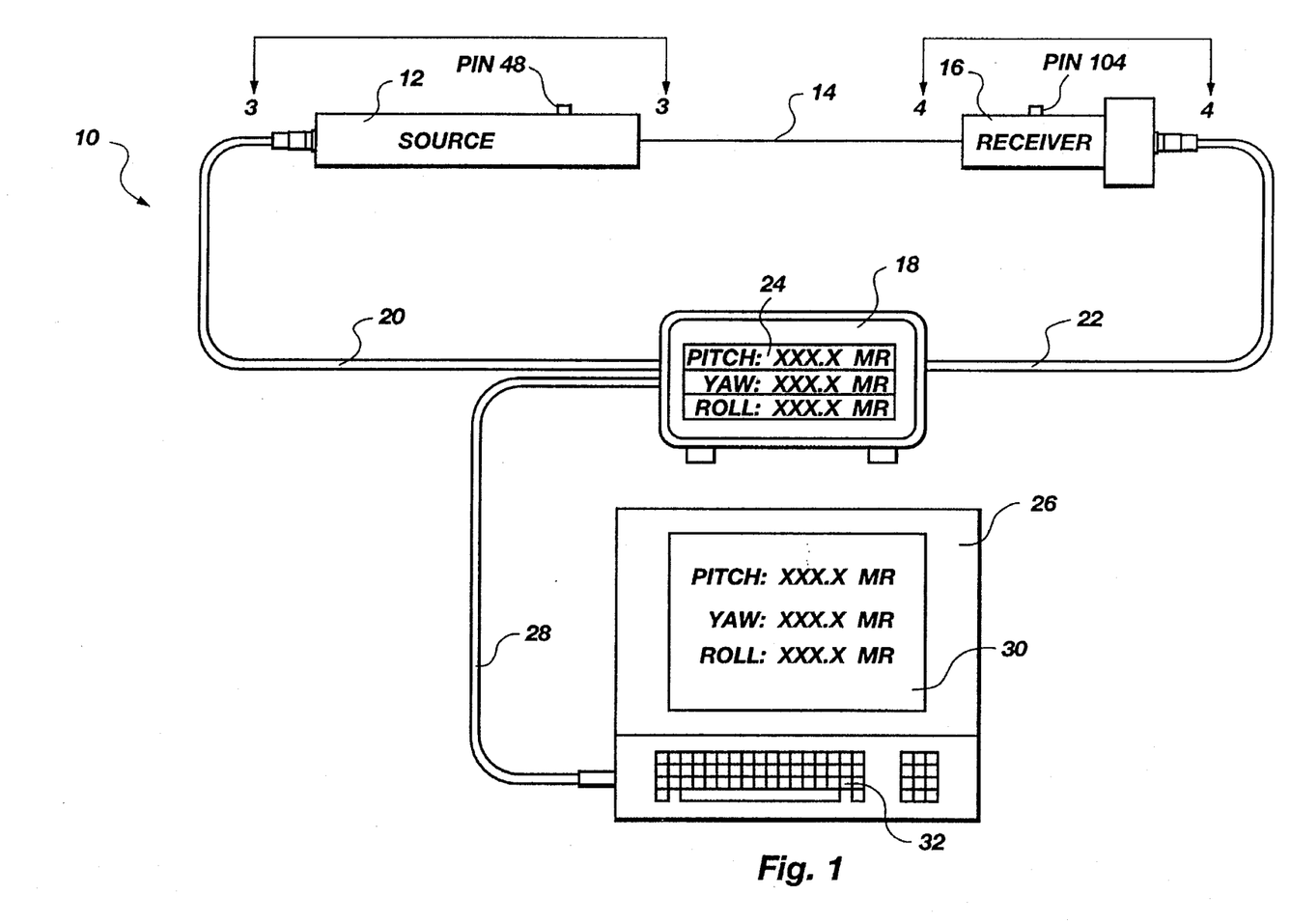
FIG. 1 illustrates a system for measuring angular position about three axes according to the present invention.

The source assembly 12 and the receiver assembly 16 are in electronic signal communication with one another and with a meter 18 by way of signal lines 20, 22. In one embodiment, the signal lines 20, 22 each include an RS485 digital communications bus. The meter 18 includes electronic circuits for receiving and transmitting data along the signal lines 20, 22 and for displaying data values on a display 24. Suitable displays 24 include conventional LCD or LED displays. The meter 18 also contains a power supply for the system 10. In some embodiments, the meter 18 includes a conventional digital microprocessor, as well as supporting circuitry such as RAM, ROM, and a numeric coprocessor.

The meter 18 is in electronic signal communication with a conventional portable computer 26 by way of another signal line 28. The computer 26 includes a display 30, a keyboard 32 or other input means, and a digital microprocessor. The signal line 28 is a serial line such as an RS232 line. Other serial lines, or parallel lines, or some combination of serial and parallel lines, may be used to carry signals in other embodiments of the system 10.

As described below, various processing and computational tasks are performed by circuitry that is physically located within the computer 26. Other tasks are performed by circuitry located within the source assembly 12 and by circuitry located within the receiver assembly 16. However, those of skill in the art will appreciate that such tasks may be partially or completely performed in other embodiments by circuitry that is located elsewhere within the system 10 by relocating the appropriate circuits and placing them in signal communication with their appropriate inputs and outputs according to the teachings herein.

Figure 2:
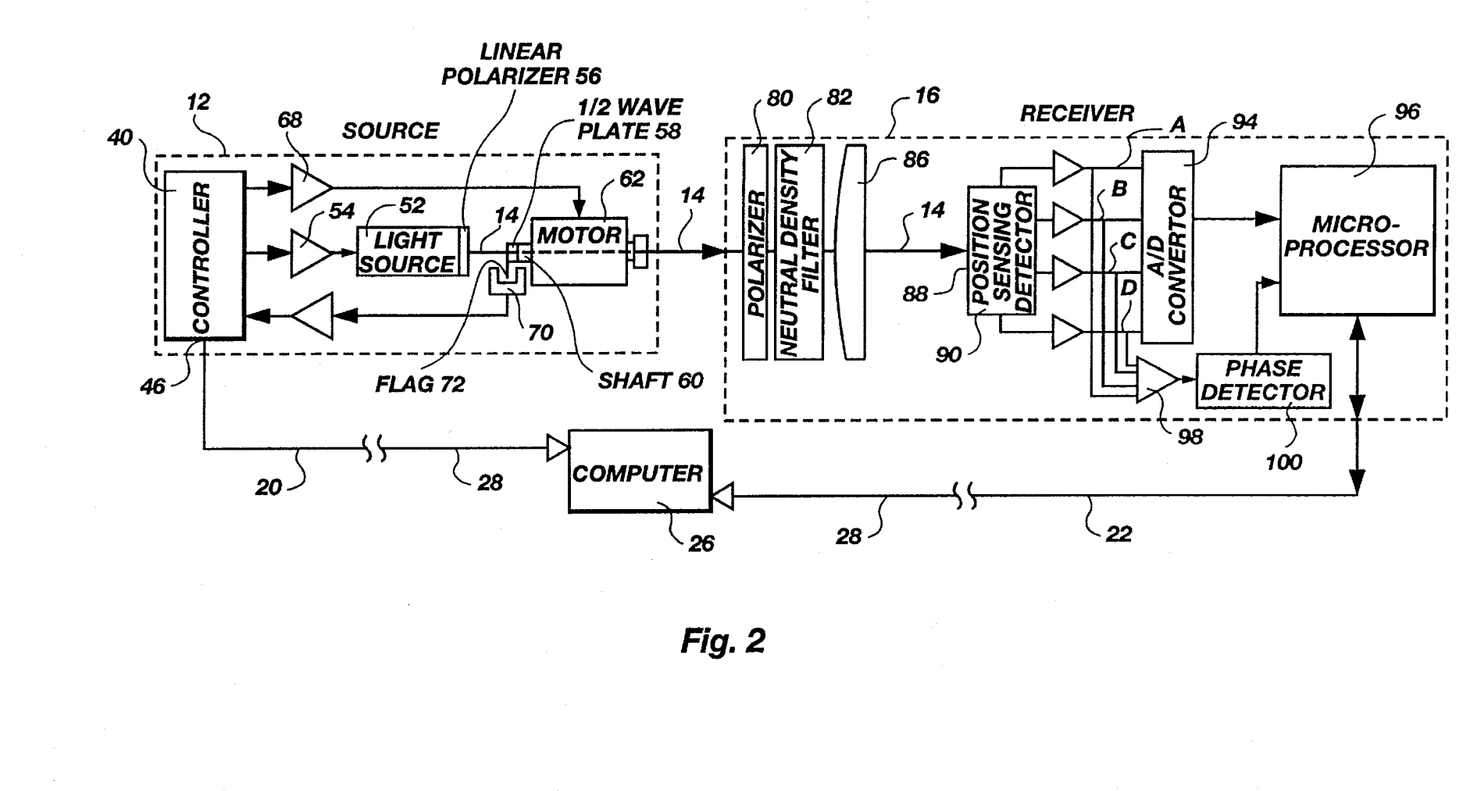
FIG. 2 is a schematic diagram illustrating one embodiment of the system of FIG. 1.
Figure 3:
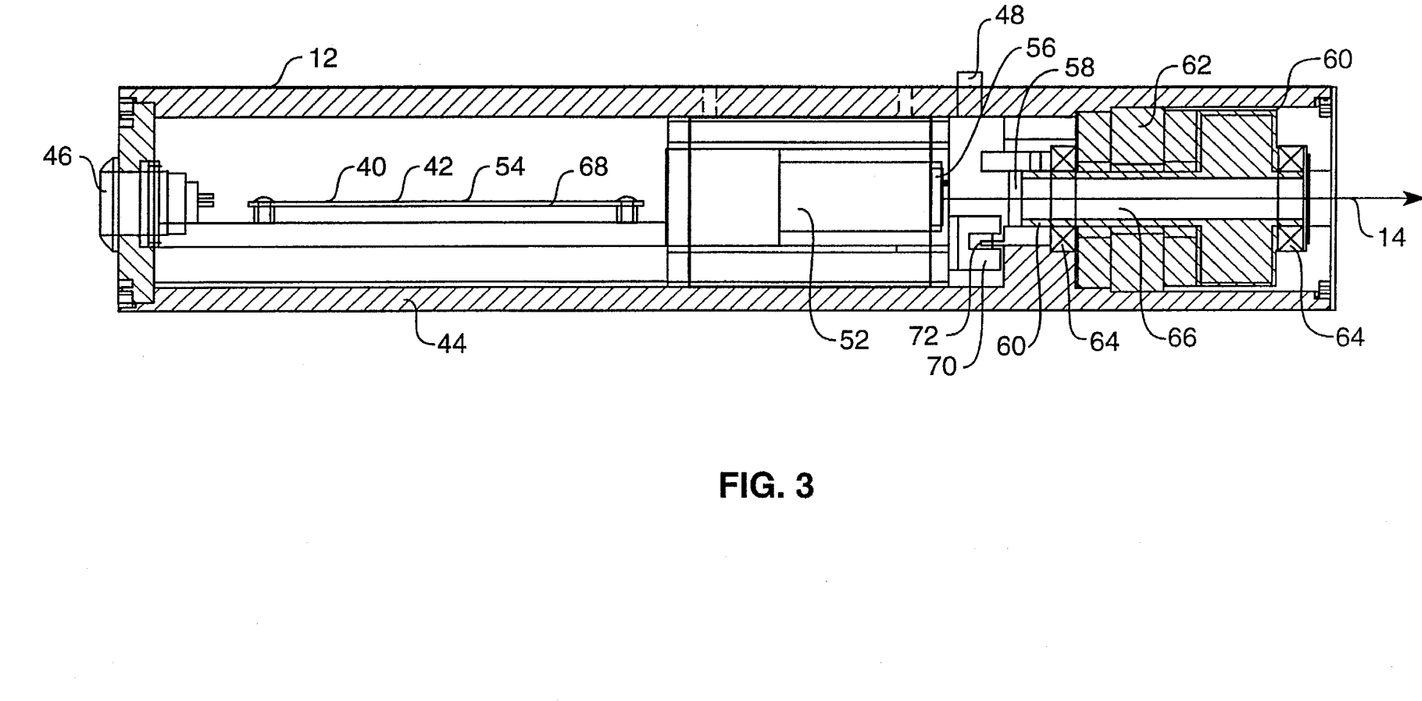
FIG. 3 is a partial longitudinal cross-section taken along line 3—3 of FIG. 1, illustrating the source assembly in the system.

With reference to FIGS. 2 and 3, the source assembly 12 includes a source controller 40. In one embodiment, the source controller 40 and other circuitry of the source assembly 12 are mounted on a printed circuit board 42 which is mounted within a conventional housing 44. The source controller 40 is in signal communication with the computer 26 by way of a conventional connector 46 and signal lines 20, 28. A source locating pin 48 is secured to the source assembly housing 44.

In one embodiment, the source controller 40 includes a timer chip on the board 42. One suitable timer is the Motorola 555 timer. In an alternative embodiment, the controller 40 includes a digital microprocessor on the board 42, such as the Motorola MC68HC711 microprocessor.

The source assembly 12 also includes a light source 52 which is in signal communication with the source controller 40 by way of a light source driver 54. The light source 52 preferably has good angular pointing stability. In one embodiment, the light source 52 includes a laser diode and collimating optics. One suitable laser diode is the 9215 laser diode available from Toshiba. Suitable collimating optics for laser diodes are available from Corning. The laser beam 14 emitted from such a laser diode light source 52 has a wavelength of about 670 nanometers, produces about one milliwatt of average power, and conforms with United States governmental regulations for Class 2 devices. Other sources of laser light having wavelengths and intensities readily determined by those of skill in the art according to the teachings herein are also suitable.

The laser driver 54 is capable of imposing a radio frequency carrier wave modulation on the beam 14 by switching the laser diode on and off to create a 50 percent duty cycle. In the embodiment illustrated, the laser driver 54 includes circuitry capable of providing constant power-stabilized modulation at a frequency of about 20 kilohertz. In one embodiment, the laser driver 54 includes a monitor circuit which is used in connection with a reference detector diode built into the laser diode to monitor the power of the laser diode in the light source 52.

Suitable circuitry for use in the laser driver 54 is available in diode laser drivers with analog modulation from Melles-griot of Irvine, Calif. and ILX Lightwave of Bozeman, Mont. The driver circuitry used in the laser driver 54 is similar to the circuitry of such commercial devices but is preferably implemented in more compact form using techniques familiar to those of skill in the art.

In alternative embodiments, circuitry capable of holding constant the power on the laser diode is located differently within the controller 40, the laser driver 54, and the light source 52. Different carrier frequencies, including frequencies which are less than about 100 kilohertz and which are compatible with the teachings herein, may be readily identified by those of skill in the art.

The source assembly 12 also includes a conventional linear polarizer 56. One suitable linear polarizer 56 is the standard dichroic sheet polarizer available from Meadowlark of Longmont, Colo. Upon emerging from the polarizer 56, the beam 14 is a polarized carrier wave beam.

In addition, the source assembly 12 includes a rotating half-wave plate 58. The plate 58 is preferably a high quality plate which has a high degree of parallelism and minimal beam deviation. One suitable plate 58 is the precision crystalline half-wave plate available from CVI of Albuquerque, N. Mex. Upon emerging from the rotating plate 58, the beam 14 is a rotationally polarized carrier wave beam.

The plate 58 is securely mounted to a hollow shaft 60 of an electric motor 62. The shaft 60 is rotationally mounted on bearings 64. The shaft 60 has a central bore 66 through which the light beam 14 travels. The presently preferred motor 62 is a brushless direct current three-phase motor having three windings controlled by a motor controller 68. One winding rotates the shaft, while the other two windings act like generators to sense voltage and thus provide the controller 68 with feedback corresponding to the rotational speed of the shaft 60. In one embodiment, a microprocessor in the controller 40 enables the laser driver 54 and also provides a timing signal to the motor controller 68.

The source assembly 12 also includes an optical encoder 70 positioned near the shaft 60. One suitable encoder is the high speed optical encoder available from Sharp. A mechanical interrupter flag 72 is secured to the shaft such that the flag 72, the shaft 60, and the half-wave plate 58 rotate in unison. The optical encoder 70 includes a beam source separated from a beam detector by a gap.

Figure 4:
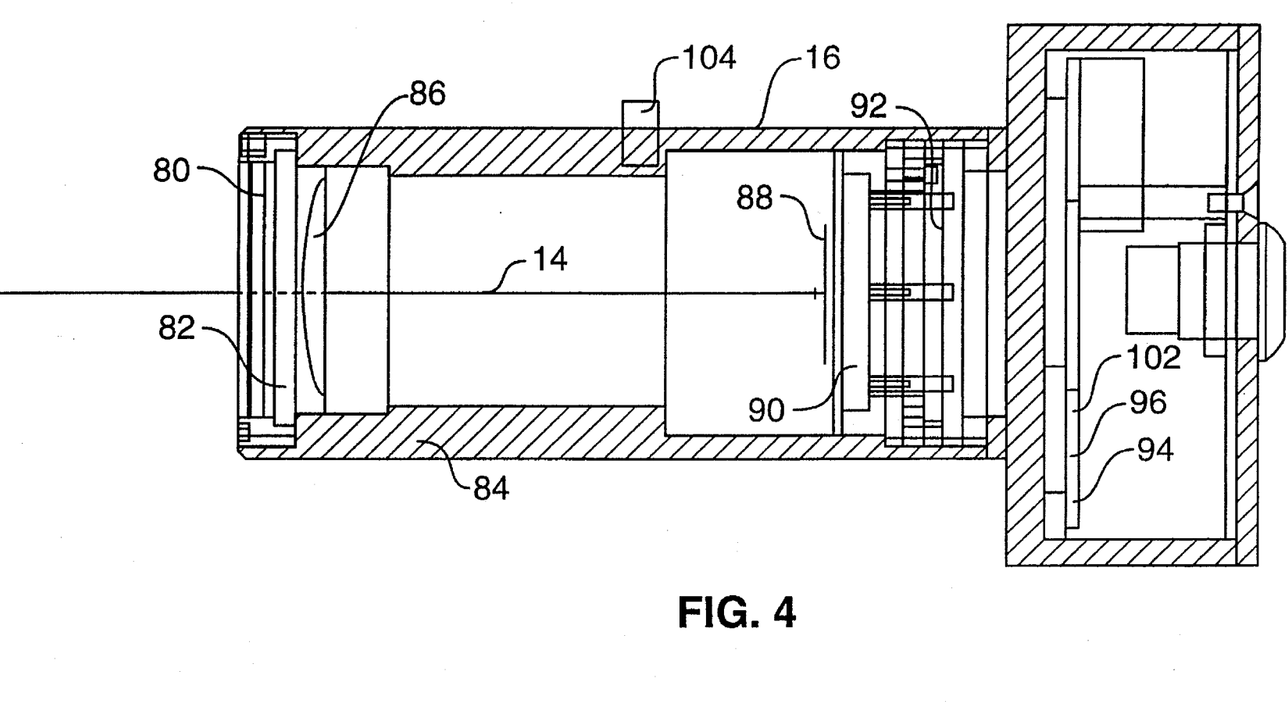
FIG. 4 is a partial longitudinal cross-section taken along line 4—4 of FIG. 1, illustrating the receiver assembly in the system.

With reference to FIGS. 2 and 4, the receiver assembly 16 also includes a linear polarizer 80. Suitable polarizers 80 include the conventional polarizers suitable for use as the polarizer 56 in the source assembly 12. A neutral density filter 82 is positioned in a receiver housing 84 adjacent the receiver polarizer 80. One suitable neutral density filter 82 is available from MeadowLark of Longmont, Colo.

A lens 86 is positioned adjacent the neutral density filter 82. The lens 86 is preferably a very high quality lens with no significant spherical aberration or coma. One suitable lens is an aplanatic achromatic lens available from Newport of Irvine, Calif. The lens 86 is preferably coated with an anti-reflective coating corresponding to the wavelength of the beam 14.

The lens 86 is positioned to focus the beam 14 on a sensing surface 88 of a two-dimensional position sensing detector 90. One suitable position sensing detector 90 is the 20 millimeter two-axis position sensing detector available from UDT of Hawthorne, Calif. The position sensing detector 90 is mounted on a mechanical slide 92 having a lock to allow separation of the sensing surface 88 and the lens 86 by the focal distance of the lens 86.

The position sensing detector produces four analog output signals A, B, C, and D, which correspond to the position of the focused beam 14 on the sensing surface 88. The signals A, B, C, and D are routed through an analog-to-digital convertor 94 to a receiver microprocessor 96. The signals A, B, C, and D are also routed to a summer 98 that produces an intensity signal corresponding to the intensity of the beam 14 at the intersection of the beam 14 and the sensing surface 88. The intensity signal is routed from the summer 98 to a phase detector 100. In the embodiment illustrated, the analog-to-digital convertor 94, summer 98, and phase detector 100 are implemented by electronic circuits on a printed circuit board 102 according to techniques familiar to those of skill in the art.

With reference to FIGS. 1, 3, and 4, a receiver locator pin 104 is secured to the receiver housing 84. The relative position of the receiver locating pin 104 and the source locating pin 48 corresponds to the relative position of the source assembly 12 and the receiver assembly 16. Those of skill will appreciate that the position of the locating pins 48 and 104 may vary from one embodiment of the present invention to another, provided that the position of the locating pins 48, 104 is fixed relative to the respective housings 44, 84 and thus establish frames of reference for the source assembly 12 and the receiver assembly 16, respectively.

In operation, the present invention provides a system for measuring relative angular position about the roll-axis. Preferred embodiments also measure relative angular position about the yaw-axis and the pitch-axis. The reference frame for the angle measurements is preferably based on the source assembly housing 44, shown in FIG. 3. In one suitable coordinate system, the roll-axis is substantially collinear with the central longitudinal axis of the cylindrical source assembly housing 44. The yaw-axis is perpendicular to the roll-axis and extends through the locating pin 48. The pitch-axis perpendicularly intersects the roll-axis and the yaw-axis. The locations of the roll-axis, yaw-axis, and pitch-axis may vary in different embodiments or for computational convenience.

With reference to FIG. 4, the receiver assembly 16 preferably has a local coordinate system which is based on the receiver assembly housing 84. In one suitable configuration, the roll-axis is collinear with the central longitudinal axis of the cylindrical receiver assembly housing 84. The yaw-axis is perpendicular to the roll-axis and extends through the receiver locating pin 104, and the pitch-axis passes perpendicularly through the intersection of the roll-axis and the yaw-axis. The locations of the roll-axis, yaw-axis, and pitch-axis may vary in different embodiments or for computational convenience. The coordinate systems are employed to calibrate the system 10.

With reference to FIGS. 1 and 3, the system of the present invention is utilized by initially securing the source assembly 12 to a first structure, such as an aircraft fuselage (not shown). The source locating pin 48 and the source housing 44 define a mechanical frame of reference for the fuselage. With reference to FIGS. 1 and 4, the receiver assembly 16 is then secured to a second structure, such as an aircraft wing (not shown), which is to be positioned relative to the first structure. The receiver locating pin 104 and the receiver housing 84 define a mechanical frame of reference for the wing.

With reference to FIG. 2, in order to permit use of the system 10 the source assembly 12 is powered on and enabled, thereby producing the beam 14 which is modulated for use in measuring angular position. Initially, the laser driver 54 imposes a radio frequency carrier wave modulation on the laser beam 14 by switching the laser diode of the light source 52 on and off to create a 50 percent duty cycle. A frequency of 20 kilohertz is presently preferred.

The resulting carrier wave beam 14 is then polarized by the linear polarizer 56. A polarized carrier wave beam 14 emerges from the polarizer 56 and travels through the rotating half-wave plate 58. The polarized carrier wave beam 14 is rotationally modulated by transmission through the rotating plate 58. The beam 14 that emerges from the rotating plate 58 has a rotating polarization at twice the speed of rotation of the plate 58. Thus, the emerging beam 14 is a rotationally polarized carrier wave beam.

In contrast with conventional approaches, the present invention directs the light beam 14 through the center of the rotating plate 58 rather than through an annular portion of a rotating polarizer. This is achieved by securing the plate 58 to the hollow shaft 60 so that the beam 14 travels through the central bore 66 of the shaft 60. Thus, imperfections in the annular regions about the center of the rotating plate 58 do not introduce noise into the system 10.

The plate may be rotated by the motor 62 at any stable speed within a range of speeds readily determined by those of skill in the art. The plate's rotational speed is preferably at least 1,000 times smaller than the carrier frequency, so that the phase shift imposed by processing electronics, such as electronics 96, 100 in the receiver assembly, is negligible. A speed of about five revolutions per second is presently utilized. Variations in motor speed are restricted to less than about 10 percent, are preferably restricted to less than about one percent, and are most preferably restricted to less than about 0.1 percent.

The encoder 70 produces a reference signal corresponding to the rotational modulation imposed by the rotating plate 58. In contrast with conventional systems which produce a reference signal by measuring the intensity of a polarized light beam, the present invention takes the reference signal directly off the motor shaft 60 by using the encoder 70 and the interrupter flag 72.

The encoder beam source transmits a beam across the gap toward the beam detector. As the shaft 60 rotates, the flag 72 periodically interrupts the beam, generating a phase reference signal which corresponds accurately to the rotation of the plate 58 and hence to the rotational polarization of the laser beam 14 that is transmitted through the center of the plate 58.

In contrast with prior approaches, imperfections in a rotating optical reference element are eliminated as a source of noise in the system 10 because the reference signal does not depend on a beam directed through a rotating optical element. Phase shifts and noise due to conversion electronics are also eliminated, thereby substantially enhancing the accuracy of the present invention.

After the beam 14 leaves the source assembly 12 on the fuselage, the beam 14 travels along the roll-axis toward the receiver assembly 16 on the wing. After passing through the receiver polarizer 80, the beam 14 reaches the neutral density filter 82. The neutral density filter 82 attenuates the beam 14 in order to keep the power density of the beam 14 within the linear limits of the position sensing detector 90.

The output signals A, B, C, and D from the position sensing detector 90 are routed to the receiver microprocessor 96. The microprocessor 96 uses the signals to determine yaw and pitch according to the following equations:

$$\text{pitch} = \tan^{-1}\left( \frac{Y}{F} * \frac{(C-D)}{(C+D)} \right) \quad (1)$$

$$\text{yaw} = \tan^{-1}\left( \frac{X}{F} * \frac{(A-B)}{(A+B)} \right) \quad (2)$$

where Y is the height of the sensing surface 88, X is the width of the sensing surface 88, and F is the focal length of the lens 86.

The receiver microprocessor 96 also receives the output of the phase detector 100, as well as the source reference signal from the optical encoder 70. Using the period T of the detected power variation of the beam 14 on the sensing surface 88 and the time difference Δt between the source reference signal and the phase detector signal, the receiver microprocessor 96 calculates the roll of the target polarizer 80 relative to the optical encoder 70 according to the following equation:

$$\text{roll} = \pi * \frac{\Delta t}{T} \quad (3)$$

In this manner the angular position of the wing relative to the fuselage is determined with the aid of the system 10. The wing is then repositioned, the wing's new position is determined, and these steps are repeated until the desired wing position is achieved. Although the capabilities of the system 10 are illustrated in connection with relative positioning of the fuselage and wing of an aircraft, those of skill in the art will appreciate that the present invention is also useful in a wide variety of other contexts.

With reference to FIGS. 1 through 4, the system 10 is preferably configured to reduce errors caused by differences in the assumed and actual relative positions of components of the system 10. In practice the beam 14 may be subject to pitch and yaw offsets rather than being perfectly aligned with the source assembly housing 44. Such offsets typically arise from imperfections in the laser diode or misalignment of the laser diode and collimating optics within the housing 44. Similarly, the reference signal from the optical encoder 70 may be out of phase with the rotational modulation imposed on the beam 14 by the plate 58. Such a phase offset typically arises from relative misalignment of the laser diode in the light source 52, the polarizer 56, the fast axis of the plate 58, the motor shaft 60, and the interrupter flag 72.

The position sensing detector 90 may be misaligned with the lens 86 or the receiver assembly housing 84, resulting in pitch or yaw offsets. Misalignment of the polarizer 80 in the housing 84, or phase shifts in the electronic circuits of the position sensing detector 90 or the phase detector 100, may cause errors in the roll measurement unless they are corrected. In addition, the pitch and yaw measurements may be subject to non-linearities caused by the lens 86 or by the electronics in the receiver assembly 16.

Some errors caused by misalignment of components of the system 10 may be reduced by physically repositioning the appropriate components. Thus, the locking slide 92 is preferably positioned such that the sensing surface 88 of the position sensing detector is fixed at precisely the focal length of the lens 86. Also, the inherent axis of the plate 58 is preferably aligned precisely with the interrupter flag 72, and the polarizers 56, 80 are preferably aligned precisely with their respective locating pins 48, 104.

However, those of skill in the art will appreciate that errors caused by differences in the actual and assumed relative positions of these and other components of the system 10 may also be reduced by providing appropriate calibration offsets for use in the calculations. Suitable calibration offsets include measured differences in the ideal and actual positions of components of the system 10. For instance, in one embodiment the source microprocessor 40 is provided with the roll, pitch, and yaw offsets of the beam 14 with respect to the source assembly housing 44, and the receiver microprocessor 96 is provided with the roll, pitch, and yaw offsets of the detected beam 14 with respect to the receiver assembly housing 84. The receiver microprocessor 96 is also provided with corrections for pitch and yaw non-linearities.

The misalignments are measured and the corresponding correction values are stored in ROM or RAM accessible to the appropriate microprocessor. The correction values are then used during the calculations to compensate for the misalignments. The result of effective calibration is a system which accurately measures angles between the fixed mechanical reference frame of the source housing 44 and source locating pin 48, on the one hand, and the fixed mechanical reference frame of the receiver housing 84 and receiver locating pin 104, on the other hand.

In summary, the present invention provides accurate measurements of angular position about a roll-axis. The present invention is not sensitive to imperfections in the annular portions of a rotating optical element because the beam is transmitted through the center of the rotating wave plate rather than through an annular portion of the plate. Transmission through the center of the plate is accomplished by using a motor with a hollow shaft to rotate the plate. In addition, the present invention is not limited to roll-axis measurements. The invention also accurately measures changes in yaw and pitch by detecting movement of the beam on a two-axis position sensing detector.

Unlike conventional approaches, the present invention does not rely on the electronic conversion of polarized light intensity to produce a reference signal. Instead, a mechanical flag attached to the rotating motor shaft interrupts the beam of an optical encoder. The resulting reference signal is a clean square-wave signal with very little noise and no significant phase shift.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for measuring relative angular position, comprising:
    a source assembly capable of producing modulated light by imposing a modulation on light produced by a light source, said source assembly also capable of producing a phase reference signal corresponding to said modulation, said source assembly located along a roll-axis;
    a polarizer capable of producing polarized light by polarizing modulated light produced by said source assembly, said polarizer located along the roll-axis at a distance from said source assembly;
    a receiver assembly capable of detecting the power of polarized light produced by said polarizer and capable of producing in response a corresponding power signal; and
    an analyzer capable of analyzing said phase reference signal and said power signal and using a time difference between said phase reference signal and said power signal to produce a roll position signal corresponding to the angular position of said source assembly relative to said polarizer about the roll-axis.

2. The system of claim 1, wherein said light source is capable of producing collimated light.

3. The system of claim 1, wherein said polarizer comprises a linear polarizer.

4. The system of claim 1, wherein said source assembly produces modulated light by imposing a time-domain modulation on light produced by said light source.

5. The system of claim 1, wherein said source assembly comprises a wave plate rotatably secured to a shaft of an electric motor.

6. The system of claim 5, wherein said wave plate comprises a half-wave plate.

7. The system of claim 5, wherein said source assembly further comprises an optical encoder secured adjacent said motor shaft and an interrupter flag secured to said motor shaft, and said reference signal is generated by passage of said flag through a gap of said optical encoder.

8. The system of claim 5, wherein said shaft has a central bore through which light produced by said light source may travel.

9. The system of claim 8, wherein said light source and said source assembly are configured such that light from said light source travels substantially through the center of said wave plate and through said bore.

10. The system of claim 1, wherein said analyzer comprises a digital microprocessor, and said receiver assembly comprises a convertor for converting an analog signal corresponding to the power of polarized light into a digital power signal.

11. The system of claim 1, wherein said system further comprises a yaw-pitch measuring subsystem for measuring the relative angular positions of said source assembly and said polarizer about a yaw-axis and about a pitch-axis which are substantially perpendicular to one another and to the roll-axis.

12. The system of claim 1, wherein said source assembly further comprises a first locating pin establishing a frame of reference for said source assembly, and said receiver assembly further comprises a second locating pin for establishing a frame of reference for said receiver assembly.

13. A system for measuring relative angular position, comprising:
    a source assembly capable of producing modulated light by imposing a modulation on collimated light produced by a light source, said source assembly also capable of producing a reference signal corresponding to said modulation, said source assembly located along a roll-axis, said source assembly comprising:
        a wave plate rotatably secured to a shaft of an electric motor, said shaft having a central bore, said light source and said source assembly being configured such that light from said light source travels through said wave plate and through said bore; and
        an optical encoder secured adjacent said motor shaft, said reference signal being generated by said optical encoder;
    a polarizer capable of producing polarized light by polarizing modulated light produced by said source assembly, said polarizer located on the roll-axis at a distance from said source assembly;
    a receiver assembly capable of detecting the power of polarized light produced by said polarizer, and capable of producing in response a corresponding power signal; and
    an analyzer capable of analyzing said reference signal and said power signal and producing in response a roll position signal corresponding to the angular position of said source assembly relative to said polarizer about the roll-axis.

14. The system of claim 13, wherein said receiver assembly comprises:
    a lens having a focal length; and
    a position sensing detector capable of detecting the position of a detected beam of light along two transverse axes, said position sensing detector being located at a distance from said lens which is approximately equal to said focal length.

15. The system of claim 14, wherein said receiver assembly further comprises a neutral density filter disposed between said source assembly and said lens.

16. A system for measuring relative angular position, comprising:
    a light source;
    a wave plate rotatably secured to a shaft of a motor, said shaft having a central bore, said system being configured such that light from said light source travels through said wave plate and through said bore;
    an optical encoder secured adjacent said motor shaft and capable of generating a phase reference signal corresponding to phase modulation of light from said light source by rotation of said wave plate; and
    measurement means for receiving said phase reference signal, for receiving at least a portion of the light modulated by said wave plate, and for producing a signal corresponding to the relative angular positions of said optical encoder and said measurement means about a roll axis which is substantially perpendicular to said wave plate.

17. The system of claim 16, wherein said system is configured such that light from said light source travels substantially through the center of said wave plate and through said bore.

18. The system of claim 16, wherein said optical encoder comprises an optical encoder which includes a beam source separated from a beam receiver assembly by a gap, an interrupter flag is secured to said shaft of said motor, said system is configured such that said interrupter flag periodically passes through a gap between said beam source and said beam receiver assembly as said shaft rotates, and said phase reference signal is generated in response to the periodic passage of said interrupter flag through the gap.

19. The system of claim 16, wherein said measurement means comprises a linear polarizer, a means for producing an analog signal corresponding to the power in a beam of modulated and polarized light, and a means for converting said analog signal into a corresponding digital signal.

20. The system of claim 16, wherein said measurement means comprises yaw-pitch measuring means for measuring the relative angular positions of said optical encoder and said measurement means about a yaw-axis and about a pitch-axis substantially perpendicular to the roll-axis and to one another.

21. The system of claim 20, wherein said yaw-pitch measuring means comprises:

a lens having a focal length; and a position sensing detector capable of detecting the position of a detected beam of light along two transverse axes, said position sensing detector being located at a distance from said lens which is approximately equal to said focal length.

22. A method for determining the angular position of a first structure relative to a second structure, comprising the steps of:

imposing a rotational polarization on a light beam by transmitting the beam substantially through the center of a rotating wave plate, thereby producing a rotationally polarized beam;

producing a reference signal corresponding to the rotational polarization imposed on the light beam;

transmitting the rotationally polarized beam from the first structure through a linear polarizer which is secured to the second structure;

measuring the intensity of the beam after it passes through the linear polarizer, and producing an intensity signal corresponding to the measured intensity of the beam; and determining the angular position of the first structure relative to the second structure by using the reference signal and the intensity signal.

23. The method of claim 22, wherein said step of producing a reference signal comprises periodically interrupting an optical encoder beam with a flag that rotates in unison with the wave plate.

* * * * *